US006907551B2

United States Patent
Katagiri et al.

(10) Patent No.: US 6,907,551 B2
(45) Date of Patent: Jun. 14, 2005

(54) FAULT NOTIFICATION METHOD AND RELATED PROVIDER FACILITY

(75) Inventors: Tomoaki Katagiri, Shiki (JP); Hiroshi Kubota, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 578 days.

(21) Appl. No.: 09/969,898

(22) Filed: Oct. 2, 2001

(65) Prior Publication Data

US 2002/0073364 A1 Jun. 13, 2002

(30) Foreign Application Priority Data

Feb. 10, 2000 (JP) ........................................ 2000-302782

(51) Int. Cl.$^7$ ................................................ G06F 11/00
(52) U.S. Cl. ............................................ 714/57; 714/48
(58) Field of Search ........................... 714/57, 48, 47, 714/49, 52, 43, 39, 31, 56, 37, 18; 709/223, 224, 226, 206, 207, 217, 229

(56) References Cited

U.S. PATENT DOCUMENTS

| | | | | |
|---|---|---|---|---|
| 4,905,171 A | * | 2/1990 | Kiel et al. .................. | 702/186 |
| 5,058,113 A | * | 10/1991 | Burnham et al. ............. | 714/25 |
| 5,455,934 A | * | 10/1995 | Holland et al. .............. | 711/4 |
| 5,535,330 A | * | 7/1996 | Bell .......................... | 714/36 |
| 5,974,459 A | * | 10/1999 | Chattopadhyay et al. ... | 709/224 |
| 5,987,513 A | * | 11/1999 | Prithviraj et al. .......... | 709/223 |
| 6,282,175 B1 | * | 8/2001 | Steele et al. ................ | 370/254 |
| 6,430,711 B1 | * | 8/2002 | Sekizawa ..................... | 714/47 |
| 6,574,197 B1 | * | 6/2003 | Yaguchi et al. ............. | 370/252 |
| 6,662,318 B1 | * | 12/2003 | Baysah et al. ................ | 714/48 |
| 6,675,211 B1 | * | 1/2004 | Mamaghani et al. ....... | 709/224 |
| 6,681,349 B2 | * | 1/2004 | Sekizawa ..................... | 714/47 |
| 6,745,229 B1 | * | 6/2004 | Hauryluck et al. ......... | 709/206 |

* cited by examiner

*Primary Examiner*—Nadeem Iqbal
(74) *Attorney, Agent, or Firm*—Brinks Hofer Gilson & Lione

(57) ABSTRACT

A service desk server receives trouble ticket information TC showing a fault status of a device, whereupon incident information X is generated (t0). Subsequently, the faulty service name is retrieved from fault information table based on the trouble ticket information TC. The service desk server then enters the service name in a template to generate fault notification message data html1 and html2 for transfer to a first and a second web server, respectively. Each of first and second web servers is thereby prompted to post a fault notification on their web site, on the basis of fault notification message data html1 and html2. Thus, fault information can be automatically notified to end users.

19 Claims, 6 Drawing Sheets

FIG. 4

T1m: WE ARE CURRENTLY EXPERIENCING A SERVICE FAILURE. TECHNICIANS ARE WORKING TO RESOLVE THE PROBLEM AND RESTORE NORMAL SERVICE. WE APOLOGIZE FOR THE INCONVENIENCE AND REQUEST YOUR PATIENCE.
UNAVAILABLE SERVICE
$ FAULTY SERVICE NAME $

T1p: THANK YOU VERY MUCH FOR USING OUR SERVICE. DUE TO A FAULT IN $ A FAULT LOCATION $, $ FAULTY SERVICE NAME $ IS CURRENTLY OUT OF SERVICE. TECHNICIANS ARE WORKING TO RESOLVE AND RESTORE NORMAL SERVICE. WE APOLOGIZE FOR THE INCONVENIENCE CAUSED TO YOU, OUR VALUED CUSTOMERS, AND REQUEST YOUR PATIENCE WHILE WE WORK TO RESOLVE THIS TEMPORARY PROBLEM.

T2m: WE ARE CURRENTLY EXPERIENCING A SERVICE FAILURE. TECHNICIANS ARE WORKING TO RESOLVE THE PROBLEM AND RESTORE NORMAL SERVICE. WE APOLOGIZE FOR THE INCONVENIENCE AND REQUEST YOUR PATIENCE.
UNAVAILABLE SERVICE
$ FAULTY SERVICE NAME $
$ PROJECTED RESTORATION TIME $

T2p: THANK YOU VERY MUCH FOR USING OUR SERVICE. DUE TO A FAULT IN $ A FAULT LOCATION $, $ FAULTY SERVICE NAME $ IS CURRENTLY OUT OF SERVICE. TECHNICIANS ARE WORKING TO RESOLVE THE PROBLEM, AND WE WILL RESUME NORMAL SERVICE AT AROUND $ PROJECTED RESTORATION TIME $.
WE APOLOGIZE FOR THE INCONVENIENCE CAUSED TO YOU, OUR VALUED CUSTOMERS, AND REQUEST YOUR PATIENCE WHILE WE WORK TO RESOLVE THIS TEMPORARY PROBLEM.

FIG. 6A

```
FAULT NOTIFICATION
SEPTEMBER 1, 2000  10:30

WE ARE CURRENTLY EXPERIENCING A
SERVICE FAILURE.  TECHNICIANS ARE
WORKING TO RESOLVE THE PROBLEM AND
RESTORE NORMAL SERVICE.
WE APOLOGIZE FOR THE INCONVENIENCE
AND REQUEST YOUR PATIENCE.

UNAVAILABLE SERVICE
    MUSIC DISTRIBUTION SERVICE
```

FIG. 6B

```
sitemap  ○SERVICE   ○APPLICATION  ○FAQ   ○SERVICE
         GUIDE                            REGULATIONS

FAULT NOTIFICATION
           SEPTEMBER 1, 2000  10:30

THANK YOU VERY MUCH FOR USING OUR SERVICE.
DUE TO A FAULT IN THE MUSIC DATA DISTRIBUTION BILLING
APPLICATION, WE ARE CURRENTLY EXPERIENCING TECHNICAL
DIFFICULTIES WITH THE BILLING SYSTEM FOR OUR MUSIC
DISTRIBUTION SERVICE.  TECHNICIANS ARE WORKING TO RESOLVE
THE PROBLEM AND RESTORE NORMAL SERVICE.

WE APOLOGIZE FOR THE INCONVENIENCE CAUSED TO YOU,
OUR VALUED CUSTOMERS, AND ASK FOR YOUR PATIENCE WHILE WE
WORK TO RESOLVE THIS TEMPORARY PROBLEM.
```

FAULT NOTIFICATION METHOD AND RELATED PROVIDER FACILITY

BACKGROUND OF THE INVENTION

1. Field of Invention

The present invention relates to a provider system for providing a variety of services via a communication network to a terminal connected to the network, and to a fault notification method for posting on a web page notification of failure of a service due to a fault.

2. Description of the Related Art

The Internet has seen exponential growth in recent years, and many people using personal computers at home now have provider connectivity for browsing web sites and exchanging e-mail. In addition to PCs, people are increasingly utilizing portable telephones and terminals attached to portable phones, such as PDAs, to access the Internet and exchange mail. The use of services provided through a communication network such as the Internet is becoming increasingly common in peoples' daily lives.

In the event that a fault occurs in the system of a provider of an internet-based service providing such services, a system administrator is required to post notification of the fault and consequent service failure on a web page for the information of users. In a situation that multiple services are provided by a system, before service failure information can be uploaded onto a web page, a system administrator must determine, from among a plurality of devices comprising the provider system, which device has failed. The administrator must then determine how serious the fault is, decide if the fault will have resulted in a failure of any service, and if yes, specify the name of the service affected by the fault. However, use of this method places a great burden on system administrators.

Thus, in the conventional art, a system administrator requires comprehensive knowledge of both the devices which comprise a provider system, and the tasks carried out by the devices. The system administrator must also constantly monitor the functioning of the system, and, in the event of failure of a device in the system, be able to assess its likely impact on a service.

If a service fails, potential users need to be informed promptly. However, it will be appreciated from the preceding description that, in the conventional art, prompt notification is not possible. If a device in a provider system fails, a system administrator must complete the following actions: locate the fault; determine the nature of the fault; assess its likely impact on a service; and, finally, upload notification of the fault and consequent service failure onto a web page. A further problem of the conventional art is that it is not possible to provide reliable information to end users about a projected restoration time of a failed service.

From this description, it will be apparent that in the conventional art end users of services are subject to undesirable delays in obtaining information about a service failure. Further, they are unable to obtain reliable information about a projected time when a service will once more become available.

The present invention has been made with a view to overcoming the stated problems of the prior art, and has as its object the provision of rapid and accurate notification of service fault information to end users of a provider system. In particular, the object of the present invention is to provide a method of posting automatically, on a web site, accurate service fault information data; the data including the name of a failed service, and also a projected restoration time.

SUMMARY OF THE INVENTION

In order to solve the above problems, the present invention provides a fault notification method for posting fault information on a web site when a fault occurs in a provider facility which provides a variety of services to a terminal connected to the facility via a communication network, comprising the steps of: i.) detecting, from a plurality of monitored devices among devices constituting said provider facility, faulty devices and generating specific fault information;

ii.) locating, based on said generated specific fault information and a predetermined rule base, at least a service type, among provided services, that is out of service;

iii.) generating fault notification message data by entering said located service type in a prepared template; and iv.) automatically posting said fault information on a web site based on said generated fault notification message data.

Preferably, fault notification message data is generated by entering said service type and items extracted from said specific fault information in said template.

Said generated fault notification message data may be automatically posted on a web site via a plurality of communication networks.

The present invention further provides a fault notification method for posting fault information on a web site when a fault occurs in a provider facility which provides a variety of services to a terminal connected to the facility via a communication network, comprising the steps of:

i.) detecting, from a plurality of monitored devices among devices constituting said provider facility, faulty devices and generating specific fault information;

ii.) locating, based on said generated specific fault information and a predetermined rule base, a service type, among provided services, that is out of service and a projected time when service will be restored;

iii) generating fault notification message data by entering said located service type and the projected time when service will be restored in a prepared template; and iv.) automatically posting said fault information on a web site based on said generated fault notification message data.

The present invention further provides a fault notification method for posting fault information on a web site when a fault occurs in a provider facility which provides a variety of services to a terminal connected to the facility via a communication network, comprising the steps of:

i.) detecting, from a plurality of monitored devices among devices constituting said provider facility, faulty devices and generating specific fault information;

ii.) determining, based on said generated specific fault information, whether to automatically post said fault information, and when it is determined that said fault information is to be automatically posted;

iii.) locating, on the basis of said generated specific fault information and a predetermined rule base, at least a service type, among provided services, that would be out of service;

iv.) automatically posting information about the service type on a web site as said fault information, and when it is determined that said fault information is not to be posted automatically; and v.) prompting, on a display, an administrator to enter information on a service type that is out of service, and post information on said entered service type on a web site as said fault information.

Preferably, said specific fault information includes node information for identifying a faulty device.

Further, said specific fault information includes node information for identifying a faulty device and application information for identifying a malfunctioning application in said faulty device; and, in said predetermined rule base, said node information, said application information, and at least a service type that is out of service are correlated with one another.

The present invention further provides a fault notification method for posting fault information on a web site when a fault occurs in a provider facility which provides a variety of services to a terminal connected to the facility via a communication network, comprising the steps of:

i.) detecting, from a plurality of monitored devices among devices constituting said provider facility, faulty devices and generating specific fault information, including node information identifying a faulty device and application information identifying a malfunctioning application;

ii.) retrieving data, based on said generated specific fault information, from memory contents, each memory content including node information and application information, and including, as necessary, a service type that is out of service and an estimated recovery time, and when a service type and estimated recovery time are located as a result of the retrieval; and iii.) automatically posting, on a web site, said fault information including information on said service type and a restoration time, the restoration time being obtained by adding the amount of time of said estimated recovery to a fault time when the fault occurs.

In the case that only a service type is located as a result of said retrieval, it is possible to automatically post information on said service type as first fault information and to prompt an administrator to enter a projected restoration time, and when the projected restoration time is entered, it is possible to post, on a web site, information on said service type and said entered projected restoration time as second fault information.

Preferably, said plurality of monitored devices, among the devices constituting said provider facility, are a plurality of server devices and a plurality of network devices.

The present invention further provides a provider facility for providing a variety of services to a terminal connected to the facility via a communication network, comprising: monitoring means for monitoring operations of a plurality of monitored devices among devices constituting said provider facility, and generating specific fault information, including node information identifying a malfunctioning device; storing means for storing, in advance, said node information and information on a service type that is out of service, said node information and said service type information being correlated; generating means for retrieving, based on said specific fault information, said service type information from said storing means and entering said service type information in a prepared template for a fault notification message to generate a fault notification message; and posting means for posting fault information based on said generated fault notification message.

The method of the present invention enables a provider facility to specify at least a service type that is out of service according to a predetermined rule base and based on fault information of each device and to generate notification message data by entering the specified service type in a template data. The generated notification message data are automatically posted on a web site, thereby enabling the immediate provision of accurate fault information to users.

BRIEF DESCRIPTION OF THE DRAWINGS

FIG. 4 is a diagram illustrating contents of templates used in generating fault notification in the system.

FIG. 6A is a diagram illustrating an example of a display screen of a portable terminal.

FIG. 6B is a diagram illustrating an example of a display screen of a personal computer.

DETAILED DESCRIPTION

One embodiment of the present invention will now be explained in detail with reference to the drawings.

1. Configuration of Communication Service System

Figure 1:
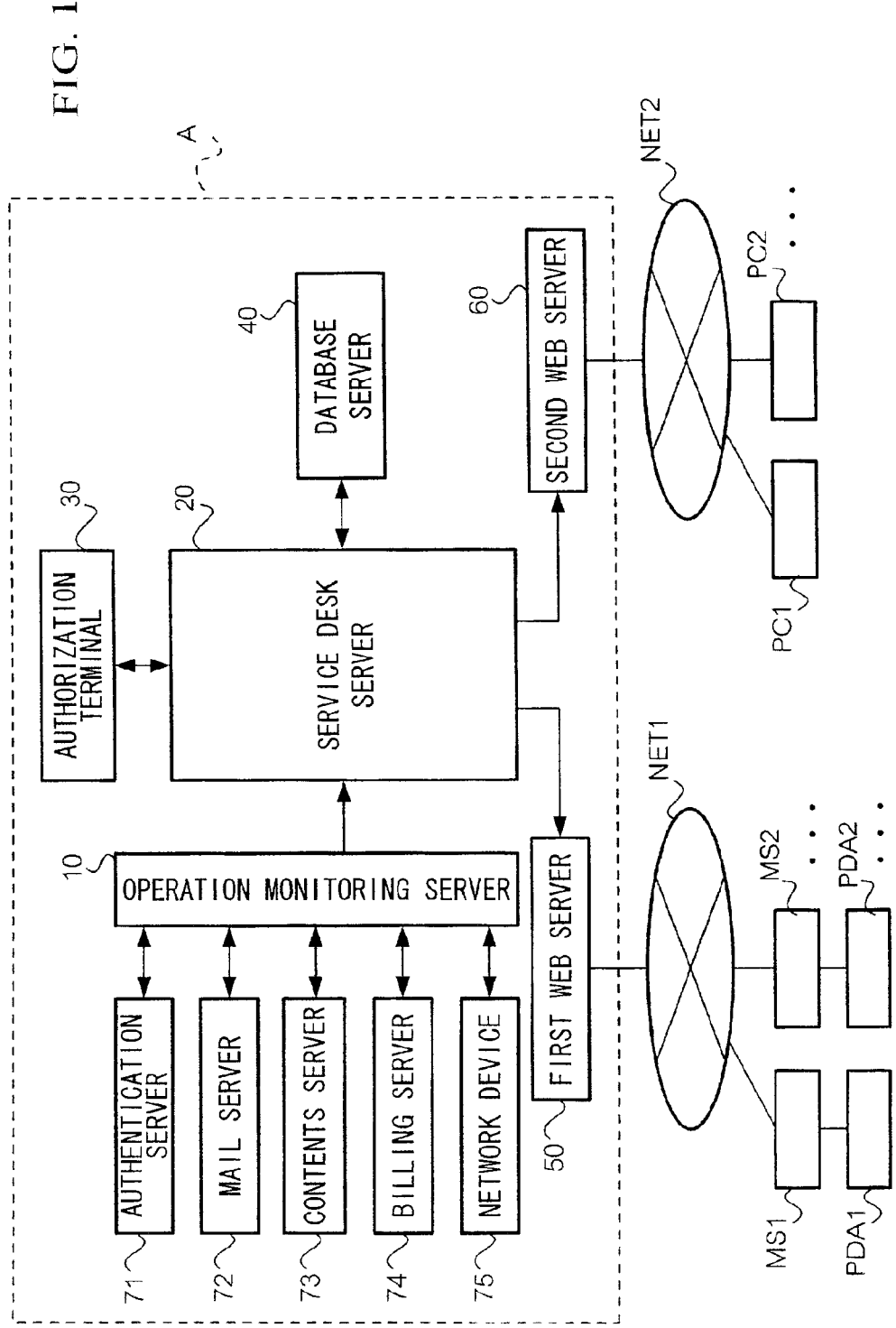
FIG. 1 is a block diagram illustrating a main configuration of a communication service system of one embodiment of the present invention.

FIG. 1 is a block diagram illustrating a main configuration of a communication service system. As shown in the figure, a communication service system comprises a provider facility A, a first communication network NET1, a second communication network NET2, communication terminals MS1, MS2, . . . , personal computers PC1, PC2, . . . .

First communication network NET1 may be, for example, a radio communication network. Each communication terminal MS1, MS2, . . . may be, for example, a portable telephone, and a portable terminal PDA1, PDA2, . . . is connected thereto; each portable terminal having a small screen for display. A web browser is loaded in portable terminals PDA1, PDA2 and the Internet can be accessed via communication terminals MS1, MS2, . . . . Alternatively, communication terminals MS1, MS2, . . . may be loaded with a web browser to enable independent access by the terminals to the Internet. Internet information, such as web pages, is displayed on a display unit of communication terminals MS1, MS2, . . . .

Second communication network NET2 may be, for example, a fixed network such as an integrated services digital network (ISDN) or a public telephone network. Each of personal computers PC1, PC2, is equipped with a monitor and communication devices including a modem.

In the communication service system, various services and fault information relating to services are provided to portable terminals PDA1, PDA2, . . . that are connected through first communication network NET1 to the system; the services including: an Internet connection service, an electronic mail delivery service, and a content providing service. An Internet connection service, however, is not provided to personal computers PC1, PC2, . . . connected to the second communication network NET2, and only fault information is provided thereto. Thus, users are informed of service fault information through either portable terminals PDA1, PDA2, . . . or personal computers PC1, PC2, . . .

Service fault information, as will be described in more detail later, includes at least a service type; and, more specifically, the name of a service which is currently unavailable. Since a monitor size of portable terminals is limited, simplified service fault notification data is displayed on portable terminals PDA1, PDA2, . . . as compared to that displayed on personal computers PC1, PC2, . . . .

Provider facility A comprises: an operation monitoring server 10; a service desk server 20; an authorization terminal 30; a database server 40; a first web server 50; and a second web server 60. Theses servers are interconnected, via local area networks and exclusive lines, in a star form with a service desk server comprising the center. First web server 50 is a device for providing service fault information to communication terminals MS1, MS2, . . . , and second web server 60 is to personal computers PC1, PC2 . . . . Service desk server 20 is administrated by a server administrator, and authorization terminal 30 by a system administrator having the authority to determine whether service fault information should be posted.

Provider facility A further comprises: an authentication server 71; a mail server 72; a contents server 73; a billing server 74; and a network device 75, each of which are connected to operation monitoring server 10. Database server 40, first web server 50, and second web server 60 are also connected to operation monitoring server 10 through a connection line (not shown).

When a user ID and password is provided to authentication server 71 in response to an access request from communication terminal MS1, MS2, . . . , the server authenticates and grants access permission to an authorized user. Mail server 72 is a device for sending and receiving electronic mail under either POP3 (post office protocol version 3) or IMAP4 (Internet message access protocol 4). Each of portable terminals PDA1, PDA2, . . . is thus able to send and receive electronic mail.

Contents server 73 contains different types of contents including, for example, music data, financial data such as stock prices and interest rates, and so on. Such contents can be provided to users either at cost or at no cost. Billing server 74 performs a billing operation for users who have received chargeable contents services.

These servers are not located in a single location but rather in separate, remote locations and are interconnected through exclusive lines. Network device 75 shown in FIG. 1 can consist of various different communication devices including: a router; interconnecting servers; a bridge; a switch hub; and a switchboard.

Operation monitoring server 10 executes a monitoring program, to perform constant monitoring of operations of each server and network device 75. Specifically, a monitored device issues event information showing conditions of operations or faults, and the event information is notified to operation monitoring server 10. Event information could include: an operational status of a device; a device fault that could lead to a future service stoppage if left uncorrected; or a fault that will cause a service stoppage directly. Different event information is accorded a different degree of significance.

Operation monitoring server 10 summarizes event information and selects those events accorded a higher degree of significance. Selected event information is issued as trouble ticket information, TC. Issuance of TC information is performed by operation monitoring server 10. This function will be hereinafter referred to as a manager function.

Figure 2:
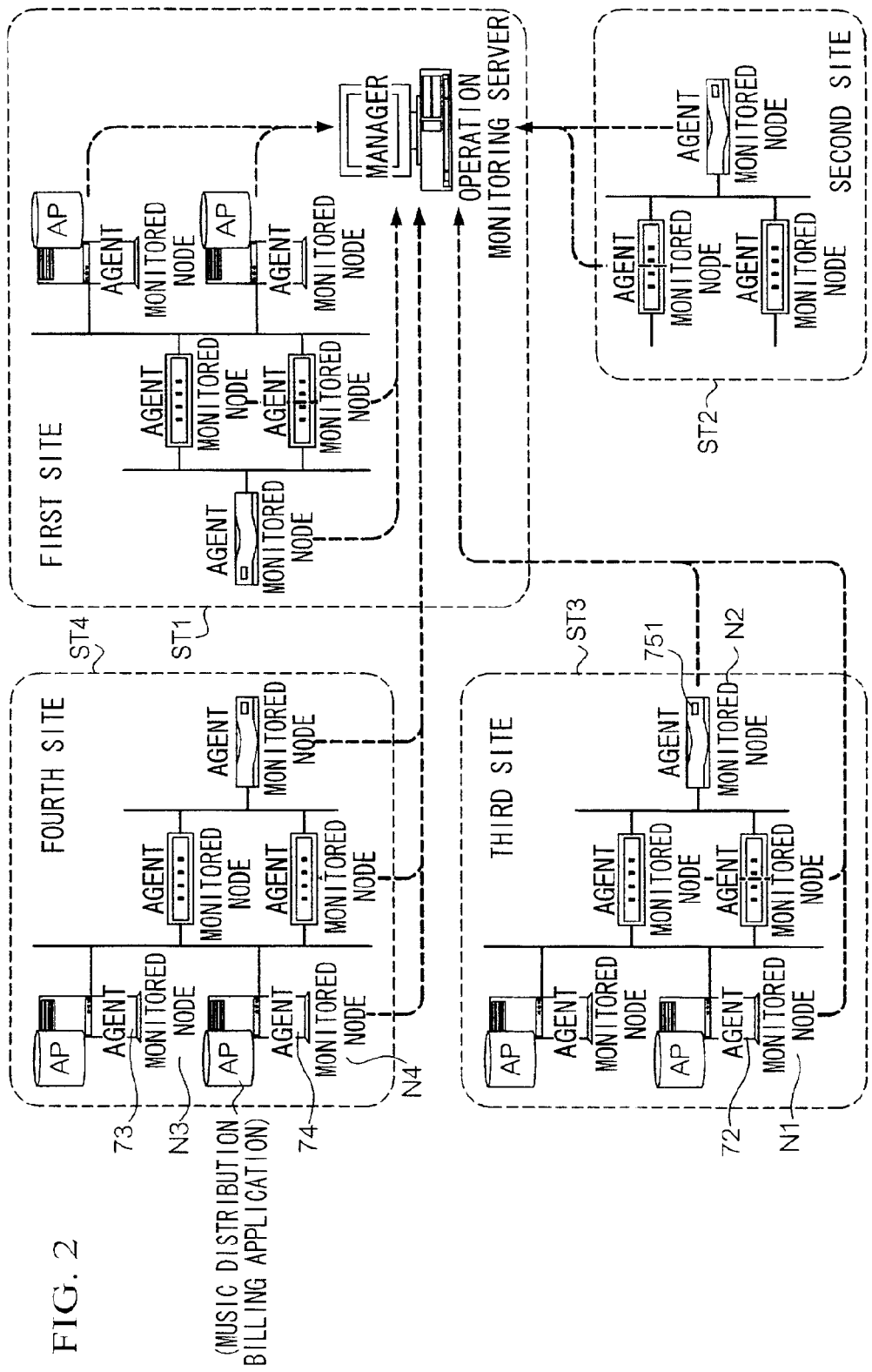
FIG. 2 is a diagram showing an example of a configuration, in the system, of server devices, network devices, and an operation monitoring server device arranged in different groupings in separate locations.

FIG. 2 is a diagram illustrating an example of a configuration of a provider facility including server devices, a network device, and operation monitoring server 10 located in separate groups. The illustrated provider facility is equipped with first to fourth sites from ST1 to ST4; with operation monitoring server 10 being located in first site ST1. Each of first to fourth sites ST1–ST4 includes a plurality of monitored nodes; each node being provided with a server device and a network device. Event information is issued by these monitored nodes. This function will be hereinafter referred to as an agent function.

The agent and manager functions consist of at least the following:

i.) a threshold monitoring function for monitoring resource values of server devices. These values may correspond to, for example, a capacity of a file system or a number of jobs in a run queue. And, in the case that a resource value exceeds or falls below a preset threshold value, event information is issued by the agent function for notification to operation monitoring server 10;

ii.) a log file monitoring function whereby log files preset for monitoring are regularly scanned. If scanning a log file creates a result meeting preset criteria, represented, for example, by a specific keyword, event information will be generated for notification to operation monitoring server 10;

iii. ) a send message function for monitoring implementation of application programs and for checking for errors. If error events meeting preset criteria occur during execution by a server of an application program, a command built into the application program is triggered to generate a message indicating a fault or problem. This message is then transmitted to operation monitoring server 10 as event information; and (iv.) a fault notifying function for notifying event information for recognition by operation monitoring server 10 when a fault occurs in a network device. Event information is issued by the network device for notification to operation monitoring server 10.

Having received event information, operation monitoring server 10 creates trouble ticket information TC, which includes: a fault time indicating a date and time of an occurrence of a fault; node information specifying a monitored node where a fault occurs; application information specifying a malfunctioning application; message (MSG) information; and object information indicating an object name. MSG information indicates categories of fault messages preset by a system developer, and the categories include: security; an application; an operating system; a network device; and others.

Service desk server 20 executes a fault notification program to generate, either automatically or semi-automatically, two types of fault notification message data, html1 and html2, for notifying fault information to users. The generated message data html1 and html2 are transmitted to first web server 50 and second web server 60, respectively. Fault notification message data html1 transmitted to first web server 50 is simpler than fault notification message data html2 transmitted to second web server 60.

The fault notification program further contains fault information table TBL where node information, application information, MSG information, object information, a faulty service name, and an estimated recovery time are correlated for storage. Data stored in such a manner is hereinafter referred to as a "rule base." A faulty service name is a name of a service that has become unavailable as a result of a fault. A recovery time is a period of time required to restore a service, as calculated from an occurrence of a fault.

In fault information table TBL, a faulty service name and an estimated recovery time are not stored for all sets of fault information. In some cases, a faulty service name is not stored in relation to a particular set of fault information. In other cases, a faulty service name is stored but without its estimated recovery time. This is because a faulty service name and/or an estimated recovery time cannot be always specified for a fault which occurs at a particular device. Provider facility A is comprised of various devices operating cooperatively. Consequently, if one device breaks down, other, cooperative devices, maybe able to take over the function of the faulty device, thereby enabling uninterrupted service provision. In contrast, a situation may occur where despite this capability suspension of a service may occur because cooperative devices are carrying out intensive processing tasks when a fault in one device occurs.

For this reason, fault information table TBL contains a name of a faulty service and/or its estimated recovery time as a regularized rule base only when a causal relation with trouble ticket information TC is apparent. In the case that no rule base corresponding to a particular trouble ticket information TC is stored in fault information table TBL, the fault notification program displays input prompts instructing a server administrator to enter, via the terminal device of service desk server 20, the faulty service name and a projected restoration time. A projected restoration time indicates a date and time at which a failed service is scheduled to be resumed. The program further displays an authorization prompt on the monitor of authorization terminal 30, thereby enabling an authorized system administrator to approve, by way of the terminal, posting of notification of the fault. Responsive to such approval, generated fault notification message data html1 and html2 are transmitted to first web server 50 and second web server 60, respectively.

In the case that a restoration time cannot be projected, an administrator of service desk server 20 is allowed to access database server 40 to obtain fault history data. Database server 40 contains information on each of the devices constituting the communication service system, information on standby equipment, and fault history information. Fault history information includes trouble ticket information TC, a name of a faulty service, a fault time, and a restoration time, which information is retrievable in response to a request made by service desk server 20. The administrator of the desk accesses database server 40 to retrieve data on a similar case, and on the basis of this data estimates a time required to restore service.

In the case that there exists a rule base in fault information table TBL, which corresponds to a fault condition indicated in trouble ticket information TC, a faulty service name and a projected restoration time are retrieved from fault information table TBL based on the trouble ticket information TC. Then, a projected restoration time is obtained from the fault time included in the trouble ticket information TC and the retrieved restoration time. The method employed in the present embodiment thus enables a computer to automatically obtain, according to a rule base stored in fault information table TBL, a faulty service name and a projected restoration time for posting in a fault notification message.

2. Operation of Communication Service System

Figure 3:
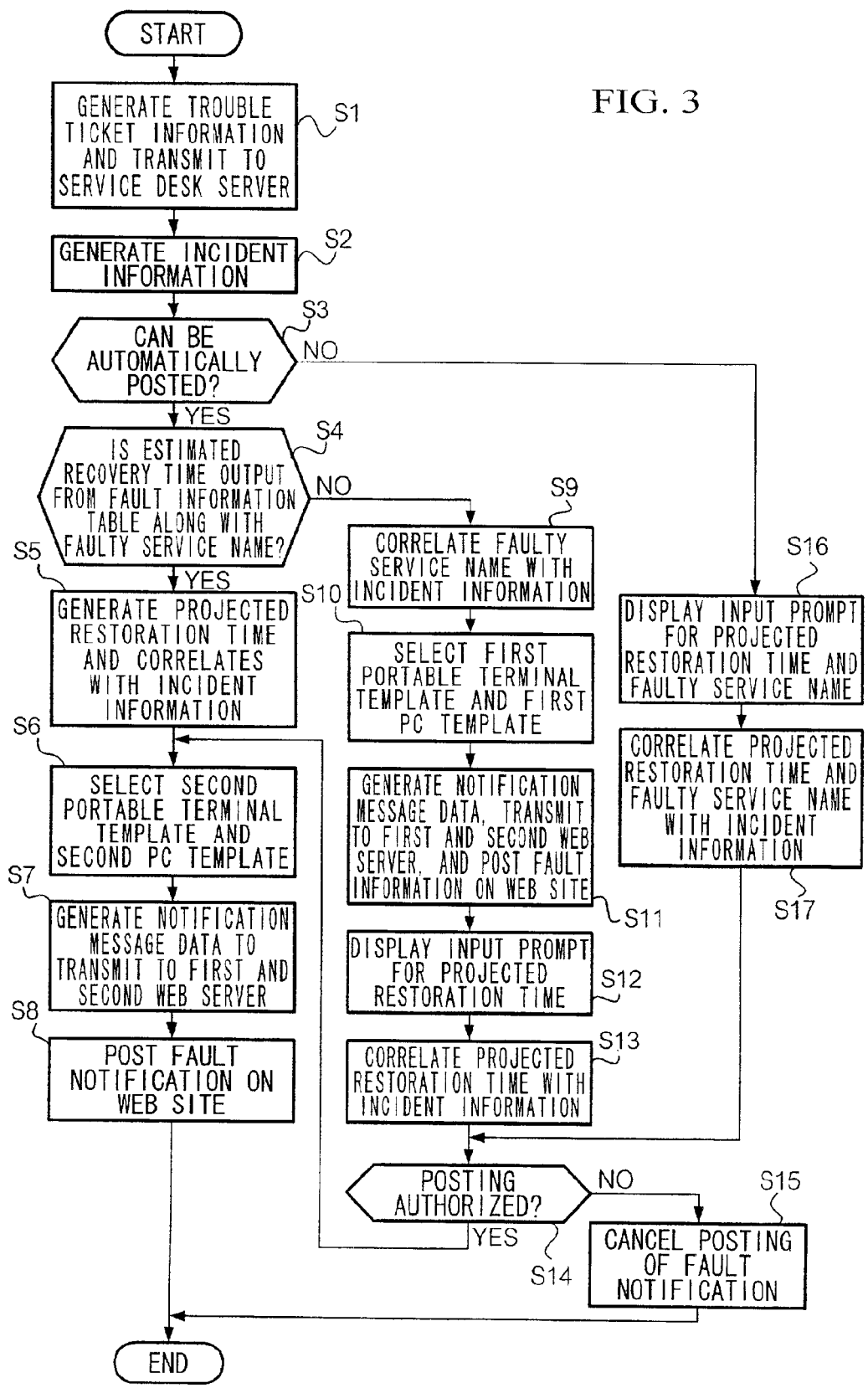
FIG. 3 is a flow chart illustrating an operation of a provider facility, used in the system, the operation functioning to notify users of fault information.

Next, operation of the communication service system will be described, with specific reference to an operation performed in response to an occurrence of a fault in one among the server and network devices which constitute the communication service system. FIG. 3 is a flow chart illustrating the operation of the provider facility notifying fault information.

First, operation monitoring server 10 receives event information transmitted from one among the server devices and network devices. Trouble ticket information TC is generated on the basis of the received event information and transmitted to service desk server 20 (S1).

Upon receiving trouble ticket information TC, service desk server 20 generates incident information X (S2). Incident information X consists of data for administrating a series of processes to be executed upon the occurrence of a fault, and is cancelled when fault notification on a web site is withdrawn. It will be apparent, then, that as long as incident information X exists, an operation must be performed to deal with a fault. Various information is added to incident information X as the series of fault recovery operations proceeds. In one example of the present embodiment, when incident information X is generated, it includes only trouble ticket information TC relating to a particular fault condition. As the routine proceeds, a faulty service name and a projected restoration time associated with the particular fault condition are additionally stored in incident information X.

Next, service desk server 20 determines whether a fault notification message can be automatically posted (S3). Specifically, a faulty service name is retrieved from the rule base stored in fault information table TBL on the basis of trouble ticket information TC, to find whether the faulty service name is output or not. In the case that the service name is output, it is determined that a fault notification message can be automatically posted. In the case that the service name is not output, it is determined that a fault notification message cannot be automatically posted.

For example, we assume that a mail server 72 is located at a monitored node N1 and a router 751 is located at a monitored node N2 in third site ST3 shown in FIG. 2. In the case that router 751 breaks down, mail server 751 cannot be accessed; as a result, a mail service becomes unavailable. In this case, therefore, fault information table TBL contains node information including N2 and the faulty service name "mail service" are stored in correlated relation with each other.

When router 751 actually fails, service desk server 20 retrieves data from fault information table TBL based on received trouble ticket information TC to obtain the faulty service name associated with this particular fault, namely "mail service."

As a result, the determination in step S3 turns "yes," and the process of automatic posting of a fault notification message is started.

In the process, service desk server 20 determines whether an estimated recovery time is output from fault information table TBL along with the faulty service name (S4). In the case that an estimated recovery time is output, the estimated recovery time is added to a fault time when a fault occurs to obtain a restoration time, which is in turn stored in correlated relation with incident information X (S5).

Subsequently, service desk server 20 selects a predetermined notification message template from a plurality of the templates (S6).

Notification message templates include a first message template T1*m* and a second message template T2*m* to be transmitted to portable terminals as well as a first message template T1*p* and a second message template T2*p* to be transmitted to personal computers. FIG. 4 shows the contents of each of the templates. In the figure, a character string sandwiched by "$," specifically, each of "$ a fault location $," "$ service name $" and "$ projected restoration time $," is to be replaced by a specific information associated with incident information X.

In performing step S6, service desk server 20 selects second message template T2*m* for portable terminals and second message template T2*p* for personal computers because incident information X includes the faulty service name and the projected restoration time.

Next, service desk server 20 enters the faulty service name and the projected restoration time in second message template T2m and a fault location, the faulty service name, and the projected restoration time in second message template T2p to generate fault notification message data html1 and html2. The fault location may indicate a faulty device where a fault has occurred or a malfunctioning application that is affected by the device fault; as described before, a faulty device is specified in the node information, and a malfunctioning application is in the application information included in trouble ticket information TC. The generated message data html1 and html2 are transmitted to first and second web servers 50 and 60, respectively (S7).

Upon receipt of the message data html1 and html2 by each of first and second web servers 50 and 60, the data is uploaded onto the web site of the servers in the form of fault notification message (S8).

In this way, when one of the devices constituting provider facility A breaks down and when there is provided a rule base corresponding to the particular fault, a fault notification message is automatically created and posted on a web site. Thus, an accurate fault notification message can be created without the need of any manual operation, and posted for the information of users rapidly in response to a device breakdown. Importantly, rather than simply including a name of faulty device, the fault notification message states a name of an affected service. Furthermore, a projected restoration time is also included in the message data for notification to users, so that they have an idea of an approximate date and time as to when the service will be resumed.

In the determination carried out in step S4, in the case that a projected restoration time is not output, a result of the determination becomes NO, and the routine proceeds to step S9. In step S9, service desk server 20 stores the faulty service name in correlation with incident information X. Next, in step S10, service desk server 20 selects first message template T1m for portable terminals and first message template T1p for PCs (S10).

Then, the server 20 enters the faulty service name in first message template T1m and the fault location and the faulty service name in first message template T1p, to generate fault notification message html1 and html2. Each message html1 and html2 is transmitted to first and second web server 50 and 60, and a first fault notification message is posted on a web site of each web server (S11).

Thus, in the case that only a name of a faulty service can be specified from a rule base, a fault notification message, including the name of the service is posted on a web page, thereby quickly informing end users of an unavailable service.

Next, on a monitor of service desk server 20 an input prompt is displayed to enable an administrator to enter a projected restoration time (S12). When the projected restoration time is input, service desk server 20 stores it in correlation with incident information X (S13).

Service desk server 20 then displays, on the monitor of authorization terminal 30, data showing a fault state and a projected restoration time, for approval of a system administrator to approve a generated fault notification message. If a displayed restoration time is not approved by the administrator, he or she can enter a different time and approve it. The time entered by the system administrator is transmitted to service desk server 20, and, on the basis of the information received, the server 20 causes the received restoration time to be correlated with incident information X. Alternatively, the system administrator can cancel posting of the second fault notification by disapproving the generated fault notification message.

Next, service desk server 20 determines whether posting of the fault notification message has been approved (S14). If not, posting of the fault notification message is cancelled (S15). If posting has been approved, the routine advances to step S6 to perform the operations from step S6 to step S8.

In summary, even when it is possible to specify a faulty service name but not a projected restoration time, a fault notification message which includes only the faulty service name can be immediately and automatically posted on a web page. A projected restoration time is then incorporated in the fault notification message following input of a time by an administrator. Thus, users are informed of the name of an unavailable service immediately with a projected restoration time being informed later, once it has been specified.

In step S3, it is determined that fault notification cannot be automatically posted when fault information table TBL does not include any rule base corresponding to trouble ticket information TC. The routine then proceeds to step S16, and on the monitor of service desk server 20 an input prompt is displayed instructing the administrator of service desk server 20 to enter a faulty service name and a projected restoration time (S16).

When the faulty service name and the restoration time are entered, service desk server 20 correlates them with incident information X (S17). Service desk server 20 then displays an input prompt including trouble ticket information (TC), the name of an available service, and the restoration time correlated with incident information X to prompt a system administrator to authorize posting of the fault notification message. The system administrator is permitted to approve, via authorization terminal 30, a service name and restoration time transmitted from service desk server 20. Alternatively, an administrator is permitted to enter a new service name and/or a restoration time and approve it. In the case that the system administrator enters a new service name and/or restoration time, they are transmitted to service desk server 20 and correlated with incident information X.

The routine then proceeds to step S14, described above, and service desk server 20 determines whether posting of a fault notification message is approved or not (S14). If the determination is negative, the posting of a fault notification message is cancelled (S15). In a positive case the routine proceeds to step S6 and implements the processes from step S6 to step S8. In this way, the method employed in the present embodiment enables posting of a fault notification message in the case that a rule base does not exist for a particular fault condition.

In addition, in the method of the present embodiment, a new rule base can be added by a system administrator. For example, a situation may arise where a rule base required for posting a fault notification for an error associated with a particular server device is not stored in fault information table TBL. This would be the case where a server device is newly added to provider facility A. To avoid such a situation, it is desirable for system administrator experience to be utilized in operating the system since, in the early stages of a new service, problems representing a new fault case may occur. The present embodiment enables a system administrator to create a new rule base by adding, to fault information table TBL, trouble ticket information TC and a faulty service name, and/or an estimated recovery time. Thus, in the present embodiment, augmentation of a system can be responded to flexibly.

Next, the process for posting fault notification will be described more in detail. Assuming that, in the communication service system shown in FIG. 2, a contents server device 73 is located at a monitored node N3 and that a billing server device 74 is located at a monitored node N4 in a fourth site ST4. Contents server 73 provides a chargeable music data distribution service, and billing server 74 contains a music data distribution billing application which facilitates billing with regard to the distribution service provided by contents server 73. We will assume further that a fault has occurred in the music data distribution billing application (hereinafter will be denoted as "AP1.")

Figure 5:
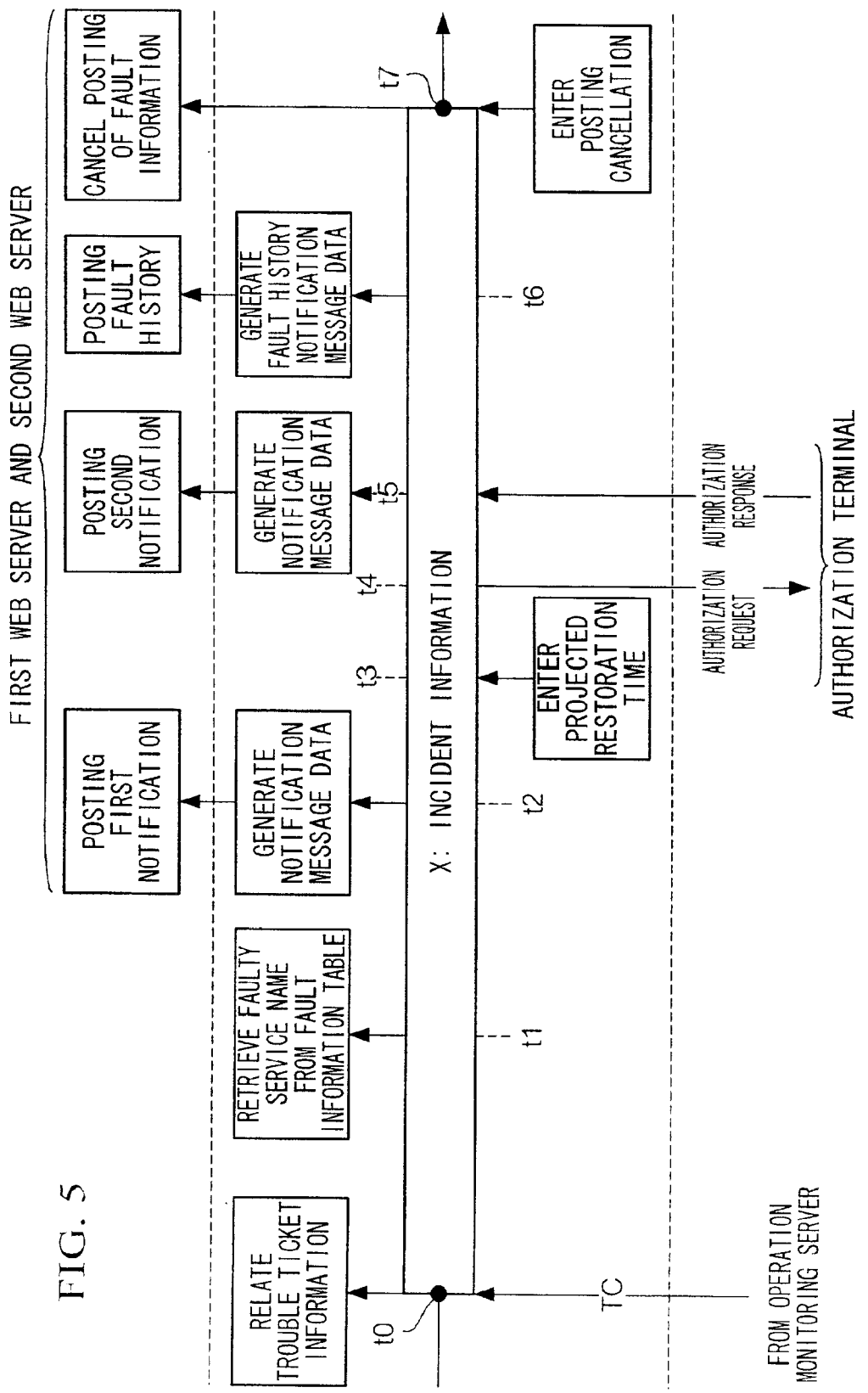
FIG. 5 is an example of an operation of service desk server used in the system.

FIG. 5 is a diagram illustrating an example of an operation of service desk server 20. As shown in the figure, when an abnormal condition occurs at music data distribution billing application AP1, operation monitoring server 10 locates the problem and issues trouble ticket information TC. This trouble ticket information TC indicates N3 as node information and AP1 as application information.

At time t0, service desk server 20, upon receiving trouble ticket information TC, generates incident information X. At time t1, data is retrieved from fault information table TBL based on trouble ticket information TC correlated with the generated incident information X. In the case that fault information table TBL contains only a faulty service name, namely, a music data distribution service, but no projected restoration time related with N3 and AP1, only the faulty service name is correlated with incident information X.

At time t2, service desk server 20 enters the faulty service name in first template T1m for portable terminals and the faulty service name and a fault location, in this case, music data distribution billing application AP1, in first template T1p for PCs, thereby creating fault notification message data html1 and html2 for transfer to first web server 50 and second web server 60, respectively.

In the present embodiment, different types of fault notification messages for a single fault state are generated separately for different types of terminals. For example, when portable terminal PDA1 accesses first web server 50, a screen shown in FIG. 6A is displayed; and when personal computer PC1 accesses a second web server 60, a screen shown in FIG. 6B is displayed. The screen displayed for personal computer PC1 includes more detailed information such as a cause of a service failure; and may show a message reading: "due to a fault in the music data distribution billing application . . . ", for example. Due to size limitations of a display of a portable terminal PDA1, the number of characters which can be shown is limited.

At time t3, on the monitor of service desk server 20 an input prompt is displayed instructing an administrator to input a projected restoration time. Following input of a restoration time, service desk server 20 correlates the restoration time with incident information X. At time t4, service desk server 20 requests authorization terminal 30 to authorize the posting of fault notification. When authorized at time t5, the name of the affected service and the projected restoration time are entered in second template T2m for portable terminals, and the fault location, the name of the affected service, and the projected restoration time are in second template T2p for PCs, thereby generating fault notification message data html1 and html2 for transfer to first web server 50 and second web server 60, respectively. Thus, end users of a service are able to view a second fault notification message on a web page.

When music data distribution billing application AP1 is restored to normal operation, an administrator of service desk server 20 enters an actual restoration time at time t6, and instructs posting on a web page of a fault history associated with the particular fault. Subsequently, service desk server 20 correlates the entered restoration time with the incident information X and generates fault history message data for transfer to first web server 50 and second web server 60. First web server 50 and second web server 60, in turn, are caused to update their own list of past fault conditions on the basis of the received data, and to display fault history information on a web page.

When an administrator of service desk server 20 enters an instruction to end incident information X at time t7, or an instruction to remove posting of a fault notification message on a web page, a request to cancel the message is transmitted to first web server 50 and second web server 60, whereby the posting operation is completed.

Modification:

In addition to fault information table TBL in service desk server 20 described in the above embodiment, trouble ticket information TC and its actual restoration time may be stored in correlation with each other, as a knowledge base, in database server 40. From the knowledge base stored in database server 40, a rule may be automatically extracted. Based on the extracted rule, an estimated recovery time can be automatically added to fault information table TBL, or a stored estimated recovery time can be updated. The longer the communication service system is operated, the greater the amount of information which is accumulated in the knowledge base. In this way, information accumulated in the knowledge base enables more accurate notification of projected restoration times for services to end users.

What is claimed is:

1. A fault notification method for posting fault information on a web site when a fault occurs in a provider facility which provides a variety of services to a terminal connected to the facility via a communication network, comprising the steps of:

detecting, from a plurality of monitored devices among devices constituting said provider facility, faulty devices;

generating specific fault information, wherein said specific fault information includes node information to identify a faulty device and application information to identify a malfunctioning application in said faulty device;

automatically retrieving from a predetermined rule base, based on said generated specific fault information, at least a service type, that is out of service, wherein said node information, said application information, and said service type are correlated in said predetermined rule base;

entering said located service type in a prepared template to generate fault notification message data; and automatically posting said fault information on a web site based on said generated fault notification message data, wherein said fault information is accessible by end users of services provided by said provider facility who otherwise access said malfunctioning application.

2. A fault notification method as claimed in claim 1, wherein said fault notification message data is generated by entering said service type and items extracted from said specific fault information in said template.

3. A fault notification method as claimed in claim 2, wherein said generated fault notification message data is automatically posted on a web site via a plurality of communication networks.

4. A fault notification method as claimed in claim 1, wherein said plurality of monitored devices, among the devices constituting said provider facility, are a plurality of server devices and a plurality of network devices.

5. A fault notification method for posting fault information on a web site when a fault occurs in a provider facility which provides a variety of services to a terminal connected to the facility via a communication network, comprising the steps of:

detecting, from a plurality of monitored devices among devices constituting said provider facility, faulty devices;

generating specific fault information;

automatically retrieving from a predetermined rule base, based on said generated specific fault information a service type, from among a plurality of provided services, that is out of service and a projected time when service will be restored;

requesting manual entry by a system administrator of a service type and a projected time when service will be restored in response to unsuccessful automatic retrieval from said predetermined rule base of said service type and said projected time when service will be restored;

requesting manual entry by the system administrator of a projected time when service will be restored in response to successful automatic retrieval from said predetermined rule base of a service type and unsuccessful automatic retrieval from said predetermined rule base of a projected time when service will be restored;

automatically entering said automatically retrieved or said manually entered service type and the projected time when service will be restored in a prepared template to create fault notification message data; and automatically posting fault information on a web site based on said fault notification message data so that end users of services provided by the provider facility will be notified what service is out and when said service is expected to be restored.

6. A fault notification method for posting fault information on a web site when a fault occurs in a provider facility which provides a variety of services to a terminal connected to the facility via a communication network, comprising the steps of:

detecting, from a plurality of monitored devices among devices constituting said provider facility, faulty devices;

generating specific fault information for the detected faulty devices;

determining, based on said generated specific fault information, whether to automatically post fault information, and when it is determined that said fault information is to be automatically posted;

locating, on the basis of said generated specific fault information and a predetermined rule base, at least a service type, among provided services, that would be out of service;

automatically posting information about the service type on a web site as fault information so that end users of said service type will be notified, and when it is determined that said fault information is not to be posted automatically;

prompting, on a display, an administrator to enter information on a service type that is out of service, and post information on said entered service type on a web site as fault information so that end users of said service type will be notified.

7. A fault notification method for posting fault information on a web site when a fault occurs in a provider facility which provides a variety of services to a terminal connected to the facility via a communication network, comprising the steps of:

detecting, from a plurality of monitored devices among devices constituting said provider facility, faulty devices and generating specific fault information, including node information indicative of a faulty device and application information indicative of a malfunctioning application;

retrieving data, based on said generated specific fault information, from memory contents, wherein each memory content includes node information and application information, and each of said memory contents include, as necessary, a service type that is out of service and an estimated recovery time, and when a service type and estimated recovery time are located as a result of the retrieval;

automatically posting, on a web site, fault information including information on said service type and a restoration time, wherein the restoration time is obtained by addition of the amount of said estimated recovery time to a fault time that is the time when the fault occurs.

8. A fault notification method as claimed in claim 7, further comprising the steps of:

i.) in the case that only a service type is located as a result of said retrieval, automatically posting information on said service type as first fault information; and ii.) prompting an administrator to enter a projected restoration time, and when the projected restoration time is entered;

iii.) posting, on a web site, information on said service type and said entered projected restoration time as second fault information.

9. A provider facility for providing a variety of services to a terminal connected to the facility via a communication network, comprising:

monitoring means for monitoring operations of a plurality of monitored devices among devices constituting said provider facility wherein said monitoring means is configured to generate specific fault information, including node information identifying a malfunctioning device;

storing means for storing, in advance, said node information and information on a service type that is out of service, said node information and said service type information being correlated;

generating means for retrieving, based on said specific fault information, said service type information from said storing means, wherein said generating means is configured to enter said service type information in a prepared template for a fault notification message to generate a fault notification message; and posting means for posting fault information based on said generated fault notification message.

10. A fault notification method as claimed in claim 5, wherein said specific fault information includes node information for identifying a faulty device and application information for identifying a malfunctioning application in said faulty device; and wherein said node information, said application information, and at least a service type that is out of service are correlated with one another in said predetermined rule base.

11. A fault notification method as claimed in claim 5, wherein automatically entering comprises entering said automatically retrieved or said manually entered service type and the projected time when service will be restored in a first prepared template and entering said automatically retrieved service type in a second prepared template when the projected time when service will be restored is not automatically retrieved.

12. A fault notification method as claimed in claim 11, wherein entering said automatically retrieved service type in a second prepared template comprises in response to receipt of a manually entered projected time when service will be restored, entering said automatically retrieved service type and said manually entered projected time when service will be restored in said first prepared template.

13. A fault notification method for posting fault information on a web site when a fault occurs in a provider facility which provides a variety of services to a terminal connected to the facility via a communication network, comprising the steps of:

generating specific fault information that includes node information and application information, said node information indicative of a faulty device within a plurality of monitored devices constituting a provider facility and said application information indicative of a malfunctioning application in said faulty device;

automatically requesting from a predetermined rule base one of a plurality of service types, that is out of service and a projected time when said one of said service types will be restored, wherein said request includes at least one of said node information or said application information;

generating a request for manual entry by a system administrator of a service type and manual entry of a projected time when service will be restored in response to an unsuccessful automatic request for said service type and said projected time when service will be restored;

generating a request for manual entry by a service administrator of a projected time when service will be restored in response to a successful request for a service type and an unsuccessful request for a projected time when service will be restored;

automatically inserting in a first predefined fault notification message template said automatically requested or said manually entered service type and said projected time when service will be restored;

automatically inserting in a second predefined fault notification message template said automatically requested service type when said automatic request for said projected time when service will be restored was not successful; and automatically posting fault information on a web site based on said first predefined fault notification message template or said second predefined fault notification message template so that end users of said services provided by said provider facility are alerted to a non-operational service.

14. A fault notification method as claimed in claim 13, further comprising:

in response to receipt of a manually entered projected time when service will be restored, inserting in the first predefined fault notification message template said automatically requested service type and said manually entered projected time when service will be restored; and replacing said posted fault information that was posted based on said second predefined fault notification message template with fault information based on said automatically requested service type and said manually entered projected time when service will be restored that was inserted in said first predefined fault notification message template.

15. A system to provide fault notification when a fault occurs in a provider facility that provides a variety of services to a terminal connected to said facility via a communication network, the system comprising:

an operating monitor server configured to receive event information over the communication network from monitored nodes in said provider facility, wherein said event information includes at least one of a condition of operation or a fault indication, wherein said operating monitor server is further configured to process said received event information and selectively generate trouble ticket information;

a service desk server configured to receive and process said trouble ticket information and access a rule based fault information table to automatically generate fault notification message data comprising a faulty service when said faulty service can be determined based on said trouble ticket information;

wherein said service desk server is further configured to generate a request for manual entry by a system administrator of fault notification message data comprising a faulty service and a projected time when service will be restored when fault notification message data is cannot be automatically generated from said rule based fault information table; and wherein said service desk server is further configured to generate a fault notification message from said fault notification message data to alert end users of services of said provider facility of said faulty service.

16. The system of claim 15, wherein said fault notification message comprises an estimated recovery time and a faulty service name generated from said fault information table when said fault notification message data is automatically generated.

17. The system of claim 15, wherein said fault notification message composes a first fault notification message configured to be displayed on a space constrained terminal display and a second fault notification message configured to be displayed on a space unconstrained terminal display.

18. The system of claim 15, wherein said service desk server is further configured to generate a request for manual entry by a system administrator of fault notification message data comprising only a projected time when a faulty service will be restored when fault notification message data automatically generated from said rule based fault information table includes said faulty service.

19. The system of claim 15, wherein said event information includes at least one of node information indicative of a faulty device and application information indicative of a malfunctioning application, and said rule based fault information table selectively comprises correlation of at least one of said node information or said application information with a faulty service and a projected time when service will be restored.

* * * * *

UNITED STATES PATENT AND TRADEMARK OFFICE
CERTIFICATE OF CORRECTION

PATENT NO. : 6,907,551 B2
DATED : June 14, 2005
INVENTOR(S) : Tomoaki Katagiri et al.

It is certified that error appears in the above-identified patent and that said Letters Patent is hereby corrected as shown below:

Title page,
Item [56], References Cited, U.S. PATENT DOCUMENTS,
"6,574,197" reference, "Yaguchi et al." should read -- Kanamaru --; and
"6,745,229" reference, "Hauryluck et al." should read -- Gobin et al. --.

Column 16,
Line 44, change "composes" to -- comprises --.

Signed and Sealed this

Eleventh Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,907,551 B2 Page 1 of 1
APPLICATION NO. : 09/969898
DATED : June 14, 2005
INVENTOR(S) : Tomoaki Katagiri et al.

It is certified that error appears in the above-identified patent and that said Letters Patent is hereby corrected as shown below:

On the Title Page

In column 1, Item (73), after "(JP)", insert --; Hewlett-Packard Company, Palo Alto, CA (US)--.

On the Title Page

In column 1, Item (30), line 1 under "Foreign Application Priority Data", delete "Feb. 20, 2000" and substitute --October 2, 2000-- in its place.

Signed and Sealed this

Fifth Day of December, 2006

JON W. DUDAS
*Director of the United States Patent and Trademark Office*